United States Patent Office 3,339,996
Patented Sept. 5, 1967

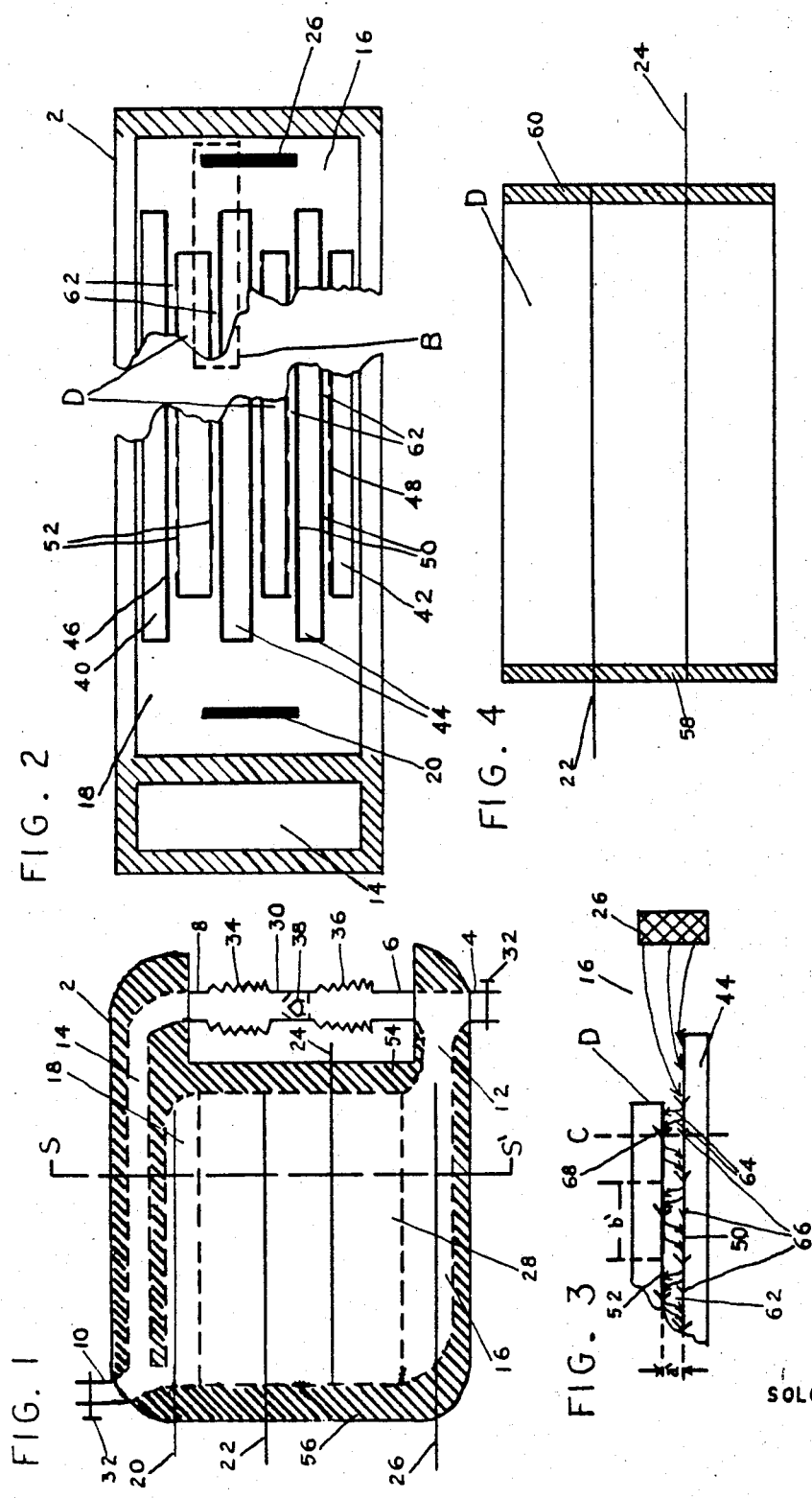

3,339,996
ELECTROPLATING LIGHT SHUTTER EMPLOYING PLATING SURFACES HAVING DIFFERING RESISTIVITIES
Solomon Zaromb, 376 Monroe St.,
Passaic, N.J. 07055
Filed Feb. 15, 1966, Ser. No. 527,579
10 Claims. (Cl. 350—160)

This invention relates to light shutter apparatus and methods. This application is a continuation-in-part of my previously filed application Ser. No. 257,988 of Feb. 12, 1963, now U.S. Patent No. 3,291,551.

In my copending application Ser. No. 257,988, filed Feb. 12, 1963, Ser. No. 305,171, filed Aug. 28, 1963, and Ser. No. 318,051, filed Oct. 22, 1963, I have disclosed electrochemically controlled light shutters based on reversible electrodeposition or electrochemical generation of light absorbing or light reflecting layers on or at transparent electrodes.

In the first of the aforementioned applications I have disclosed light modulating apparatus comprising juxtaposed transparent conductive surfaces with spaced nonconductive breaks through said conductive surfaces, the breaks on each surface being staggered with respect to those on the opposite surface. In order to stagger these breaks properly for optimum shutter performance, great care must be exercised in their alignment, and serious limitations are thereby imposed on the minimum spacings between nearest non-conductive breaks which can be effected in practice at reasonable cost to provide efficient high-speed large-area shutters. It is also necessary, for satisfactory alignment, to resort to plates with essentially flat conductive surfaces, preferably of high optical quality.

In the other two aforementioned applications I have shown how flat light shutters can be incorporated into optical systems having cylindrical, spherical or otherwise curved surfaces. However, for some applications it is preferable to have shutter lenses with the desired curvatures to start with.

It is an object of the present invention to provide improved electrochemical light shutters which do not require any critical alignment between juxtaposed conductive surfaces for satisfactory operation.

It is a further object of my invention to provide electrochemical light shutters wherein said conductive surfaces may have any desired curvature.

It is still another object of my invention to provide simple methods of constructing efficient high-speed large-area electrochemical light shutters.

According to my invention, the two juxtaposed conductive surfaces of each shutter cell are of substantially different electrical surface resistivites $\rho_1$ and $\rho_2$, such that $\rho_2$ is much greater than $\rho_1$, and the spaced non-conductive breaks are formed mainly or exclusively through the less resistive of the two surfaces. Moreover the average spacing $a'$ between said surfaces is determined by the average spacing $b'$ between nearby breaks, as well as by the resistivity $\rho_2$ and the resistivity $\rho_e$ of the electrolyte separating said surfaces, in accordance with the relation $$b'^2 \approx 16 a' \rho_e / \rho_2 \text{ or } a' \approx 0.06 b'^2 \rho_2 / \rho_e$$

The invention will be more clearly understood with the aid of the accompanying drawing in which:

FIG. 1 is a frontal diagrammatic view of a preferred embodiment of the invention;

FIG. 2 is a diagrammatic enlarged view of section S–S' of FIG. 1 in one preferred embodiment of my invention;

FIG. 3 is a further enlarged diagrammatic view of the dotted rectangular detailed B of FIG. 2;

FIG. 4 is a full frontal view of one of the plates D of FIG. 2; and

FIG. 5 is a diagrammatic view of section S—S' of FIG. 1 in an alternate embodiment of my invention.

The apparatus of FIGS. 1 through 4 comprises mainly a transparent plastic enclosure 2 with inlets or outlets 4, 6, 8, 10, connected internally to two wide electrolyte chambers 16, 18 via channels 12, 14, electrical contact strips 20, 22, 24, 26, and a transparent conductive plate assembly 28 occupying the rectangular central shutter portion indicated by the inner dotted lines of FIG. 1. Inlet-outlet pair 6, 8 is interconnected by tube 30 comprising collapsible bellows 34, 36 and one-way valve 38, all of which are made of chemically resistant flexible material such as polyvinyl or fluorocarbon resin. The electrical contact strips consisting of silver or other suitable electrical conductor may be either suspended in the wide electrolyte chambers, as in the case of strips 20, 26, or form an integral part with plate assembly 28, as in the case of strips 22, 24. These strips may be either the same chemical composition as one of the deposits plated from the electrolyte during shutter action or they may consist of chemically inert conductive material such as carbon or heavily conductive oxide-coated glass, quartz or ceramic.

Plate assembly 28 comprises at least one and preferably several pairs of juxtaposed flat transparent elements or plates, the plates of each pair having on their facing surfaces transparent conductive tin oxide films of dissimilar resistivites $\rho_1$ and $\rho_2$ such that $\rho_2$ is much higher than $\rho_1$. The outermost plates 40 and 42 have conductive films only on their inner surfaces 46 and 48, whereas each of the inner plates 44 and D is preferably conductive on both surfaces 50, 52. The film of relatively higher surface resistivity $\rho_2$ on plates 40 and 44 is preferably continuous and uniform over the entire exposed shutter area, whereas the film of low resistivity $\rho_1$ on plates D and 48 is broken up by fine nonconductive lines into a series of parallel longitudinal conductive strips of width $b'$. Plates D and 48 may also comprise one or more contact strips 22, 24 bonded into or between sections of each plate and aligned approximately in parallel with the non-conductive breaks and transparent conductive strips.

The gaps 62 of average width $a'$ between nearest plates 40 or 44 and D or 42 must be carefully adjusted to yield optimum current flow paths as indicated schematically in FIG. 3. These spacings $a'$ can be secured by inserting non-conductive spacing strips 58, 60 of thickness $a'$, made of polyethylene or other chemically resistant material, between the plates near those two shutter edges 54, 56 which are perpendicular to the longitudinal conductive strips on plates D or 48, and bonding the plates together with epoxy resin or other suitable bonding agent along said edges 54, 56 with the plates pressing against said spacing strips.

This procedure ensures both proper spacing and tight sealing of the narrow electrolyte chambers formed between nearest plates.

In operation, the gaps 62 between nearest plates as well as the wide electrolyte chambers 16, 18 and the external tube 30 are filled completely or almost completely with a suitable shutter electrolyte consisting, for instance, of a solution of 100 gm. AgI plus 150 gm. NaI per 100 gm. water, brought up to an alkaline pH of between 12 and 14 by addition of 0.1-1 gm. NaOH. To darken the shutter, an electrical potential is applied between the contact strips 20 and 22, 22 and 24, 24 and 26, thereby effecting electrodeposition of silver or iodine on the transparent conductive surfaces 46, 48, 50, and 52. The current flow paths contributing to this electrodeposition are indicated schematically by the curved double arrows 64 in FIG. 3. Starting from contact strip 26, the current flows through the electrolyte to the exposed rim of conductive surface 50 toward the electrolyte gap 62 where it branches out so that its major portion follows the zig-zag path indicated by the curved double arrows 64 while the remaining current follows the fine straight single arrows 66 along conductive surface 50. The latter part of the current does not contribute to electrodeposition and should therefore be kept small in comparison with the flow along the curved double arrows 64. The latter merge into the thick straight arrows 68 near the center line C of each conductive strip of width $b'$ on conductive surface 52. The ratio of the currents along arrows 66 and 68 is inversely proportional, in first approximation, to the ratio of the resistivities $\rho_2$ and $\rho_1$ of the respective conductive films 50 and 52. Hence in order to minimize the useless current along arrows 66, the ratio $\rho_1/\rho_2$ should be as small as practically feasible.

In an illustrative example, the surface resistivities $\rho_1$ and $\rho_2$ may be 40 ohms/square and 400 ohms/square, respectively, which should keep the useless current along arrows 66 down to only around 10% of the total current. With an electrolyte resistivity $\rho_e$ of around 8 ohm-cm. and an electrolyte gap width $a'$ of 0.001 cm., the optimum transparent conductive strip width $b'$ as given by the relation $$b' \simeq 4(a'\rho_e/\rho_2)^{1/2}$$

becomes approximately $4(0.001 \times 8/400)^{1/2} \simeq 0.02$ cm.

The inner contact strips 22 and 24 forming integral part of plates D and 42 are used only in those large-area high-speed shutters where it is necessary or desirable to limit or reduce the maximum voltage between contact strips. By connecting strips 20 and 24 to the low voltage terminal, and strips 22 and 26 to the high voltage terminal, the maximum voltage requirement for a given shutter performance is reduced to one third of the value required in the absence of the inner contact strips 22 and 24. It is thus possible to obtain high-speed action even with shutters of very large area without having to resort to excessively high voltages.

Tube 30 with collapisible bellows 34, 36 and one-way valve 38 constitutes a pumping system for circulating the electrolyte through gaps 62. Such electrolyte circulation serves to remove any bubbles trapped in gaps 62 and also to accelerate clearing of the shutter through chemical recombination of the light absorbing silver and iodine which revert to transparent silver iodide in solution. Pumping is accomplished through alternate compression and release of bellows 34, 36, which may be effected either manually or electromechanically, e.g., by a relay triggering a latch which releases a spring, said spring causing compression of the bellows and in turn triggering the release of a second spring counter-acting the first spring. With the two springs oscillating back and forth out of phase, the bellows may be compressed and released several times, thereby displacing a considerable volume of liquid before the vibrations are dampened out.

A relay and spring mechanism may also be used to pull an auxiliary slow-acting electromechanical shutter over the fast-acting electrochemical shutter in order to protect the latter from excess radiant heat and also to permit clearing the latter while the mechanical shutter remains closed. Thus, on winding back the springs to their original positions the electrochemical shutter would be found ready for instant repeat action.

In conjunction with a photo-flash detection system triggering a capacitor discharge circuit the afore-mentioned embodiment provides a relatively inexpensive, efficient, and fast-acting flash-blindness protection device.

Construction of the afore-described shutter is accomplished simply by assembling the conductive plates as outlined above and encapsulating the resulting plate assembly 28 within plastic enclosure 2 by conventional methods. The shutter is then filled with electrolyte through inlet-outlet means 4, 10, which can be opened and closed by means of stopcocks 32. Because the exact alignment of the juxtaposed plates is not at all critical, the afore-outlined construction steps do not require any painstaking procedure or costly precision tooling, and therefore provide a relatively inexpensive shutter device.

In a second embodiment of my invention, as illustrated diagrammatically in FIG. 5, assembly 28 is constituted of approximately parallel transparent cylindrical elements 70, 72, 74, 76 of approximately uniform curvature. Elements 70 and 74 are again coated with a continuous transparent conductive film of relatively high resistivity $\rho_2$, while the more conductive film or resistivity $\rho_1$ on elements 72 and 76 is again broken by non-conductive lines approximately parallel to the cylinder axis and spaced at arc intervals of length $b'$. The optimum spacing $a'$ between nearby elements is again given by the relation $$a' \simeq 0.06 b'^2 \rho_2/\rho_e$$

Except for the curvature of elements 70, 72, 74, 76 and of the overlapping sections of plastic enclosure 2, the embodiment of FIG. 5 need not differ substantially from the first-described embodiment.

There will now be obvious to those skilled in the art many modifications and variations of the structures set forth above which, however, will not depart from the scope of my invention if defined by the following claims.

I claim:

1. A light shutter comprising at least one cell including: spaced transparent elements of relatively low electrical conductivity having facing surfaces defining a space therebetween, means operatively related to said elements to confine said space to form a chamber, spaced approximately parallel strips of light-permeable electrically conductive material on one of said facing surfaces, light-permeable electrically conductive material extending over the second facing surface, the conductive material on said second surface being substantially uninterrupted but constituting an electrical conductor of higher surface resistivity than that of the conductive strips on the first of said surfaces, an electrolyte in said chamber for electrochemically interacting with said electrically conductive material on said facing surfaces, and electrical contacts extending into said chamber, said contacts being spaced by said approximately parallel strips, said contacts and strips being so related in said chamber that current will flow between adjacent low resistivity strips along paths through said electrolyte and through portions of said high resistivity material so as to form light-absorbing layers at said facing surfaces upon application of an electrical potential between said contacts.

2. A shutter as claimed in claim 1 wherein said transparent conductive material is a metal oxide.

3. A shutter as claimed in claim 2 wherein said oxide is composed mainly of tin oxide.

4. A shutter as claimed in claim 1 wherein the electrolyte solution adjacent to any of said electrical contacts acts as an electrical connector between said contacts and selected segments of said transparent conductive material.

5. A shutter as claimed in claim 4 wherein said electrical contacts are electrically conductive strips extending approximately in parallel with the transparent conductive strips on the first of said surfaces.

6. A shutter as claimed in claim 1 wherein at least one of said electrical contacts is of approximately the same chemical composition as one of the deposits platable from the electrolyte.

7. A shutter as claimed in claim 1 wherein at least one of said electrical contacts is made of carbon.

8. A shutter as claimed in claim 1 comprising electrically insulating means near the edges of said spaced elements to provide a liquid-tight enclosure and wherein inlets and outlets to said liquid-tight enclosure are provided to permit entry, removal and replacement of fluids.

9. A shutter as claimed in claim 1 wherein two or more of said cells are in back-to-back relationship.

10. A shutter as claimed in claim 1 wherein at least one of said electrical contacts is made of heavily conductive oxide-coated material.

References Cited

UNITED STATES PATENTS 3,153,113   10/1964   Flanagan _____ 88—61

JEWELL H. PEDERSEN, *Primary Examiner.*

E. S. BAUER, *Assistant Examiner.*